(No Model.)

G. BURGSTALLER.
NAILLESS HORSESHOE.

No. 520,409. Patented May 29, 1894.

Witnesses
Philipp von Hertling

Inventor
Georg Burgstaller
per Heinrich Lade
Attorney

THE NATIONAL LITHOGRAPHING COMPANY,
WASHINGTON, D. C.

UNITED STATES PATENT OFFICE.

GEORG BURGSTALLER, OF PRESSBURG, AUSTRIA-HUNGARY.

NAILLESS HORSESHOE.

SPECIFICATION forming part of Letters Patent No. 520,409, dated May 29, 1894.

Application filed November 24, 1893. Serial No. 491,918. (No model.)

*To all whom it may concern:*

Be it known that I, GEORG BURGSTALLER, a subject of the Emperor of Austria-Hungary, and a resident of the city of Pressburg, in the Kingdom of Hungary, have invented a certain new, useful, and Improved Horseshoe; and I do hereby declare that the following is a full, clear, and exact description of the invention, which will enable others skilled in the art to which it appertains to make and use the same.

This invention relates to an improved horse shoe and the object of the invention is to provide a horse shoe which may be fixed to the hoof of the horse by simple means without the use of nails and so that upon the strongest blow or concussion it will remain firm in its place without injury to the hoof or being disadvantageous in any other way.

Figure 1:
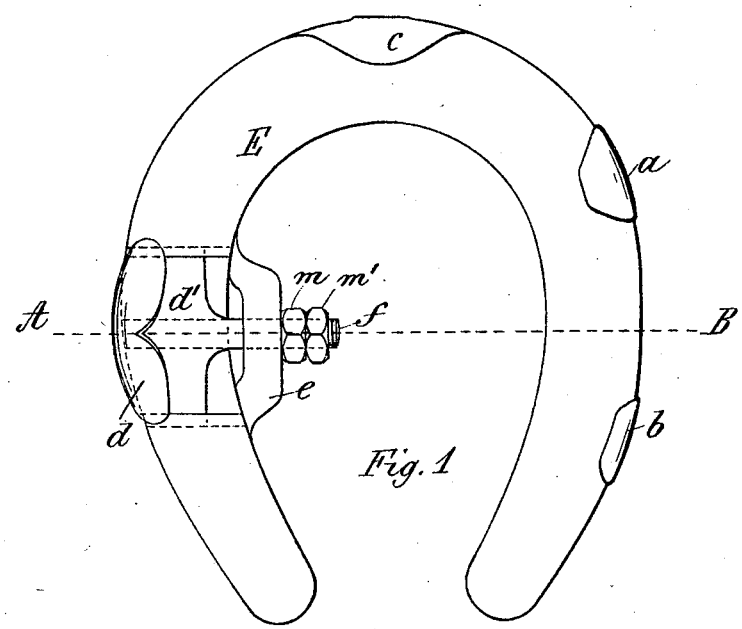
Figure 2:
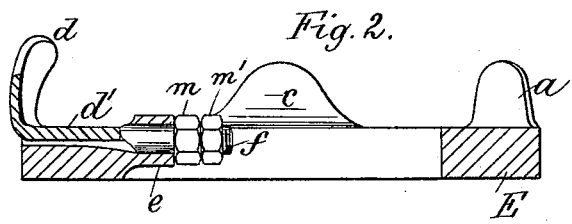
Figure 3:
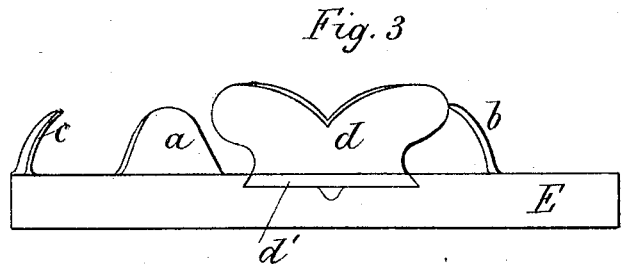

In the accompanying drawings Figure 1 is a top view of the improved horse shoe; Fig. 2 a section through line A—B of Fig. 1 and Fig. 3 a side view.

E is the shoe the inner length or portion of which is formed with two caps $a$, $b$, projecting upward from it and taking firmly against the hoof of the horse. In addition to these two fixed caps the shoe is provided with an adjustable clamp $d$ having a horizontal extension $d'$ movable by means of the end screw part $f$ and screw nuts $m$, $m'$ in a dovetail recess or bed formed in the outer portion of the shoe opposite and between the fixed caps $a$, $b$, this triangular mode of attachment being designed to give a firm and painless hold of the shoe on the hoof when the adjustable clamp $d$ is tightened against it and caps $a$, $b$, struck inward. In this way there is a regular distribution of the pressure at three points the shoe having no resisting part immediately opposite clamp $d$. The dovetail recess in which this latter is movable is not so deep as to materially weaken the shoe.

$e$ is a rib formed on the inner edge of the shoe and provided with an orifice for the reception of the screw part $f$ of adjustable clamp $d$.

$c$ is a toe cap of the usual kind and forms no part of the invention.

The shoe is attached by placing it,—after clamp $d$ has been moved outward or withdrawn from the dovetailed recess,—on the hoof so that this bears firmly against caps $a$, $b$, $c$. Clamp $d$ is then slid against the hoof and tightened by screwing up nut $m$. When the shoe is firmly fixed lock nut $m'$ is screwed up to keep nut $m$ fixed.

What I claim as my invention, and desire to secure by Letters Patent, is—

A horseshoe, having two fixed caps $a$, $b$, on the inner arm of the same and an adjustable clamp $d$ on the outer arm opposite and between said two fixed caps, said clamp being movable along a dovetailed recess and fixed by means of screw $f$ and nuts $m$, $m'$, for the purpose specified and substantially as described and shown.

In testimony whereof I sign this specification in the presence of two subscribing witnesses.

GEORG BURGSTALLER.

Witnesses:
 JOPP ZECHETNER,
 A. SCHLESSING.